Feb. 23, 1971  J. FIELDING  3,565,537
SPECIMEN HOLDER FOR EXAMPLE FOR TESTING THE COLOUR
OF A LIQUID SUCH AS BLOOD
Filed Oct. 30, 1968  2 Sheets-Sheet 1

Inventor
Jack Fielding
By Cushman, Darby & Cushman
Attorneys

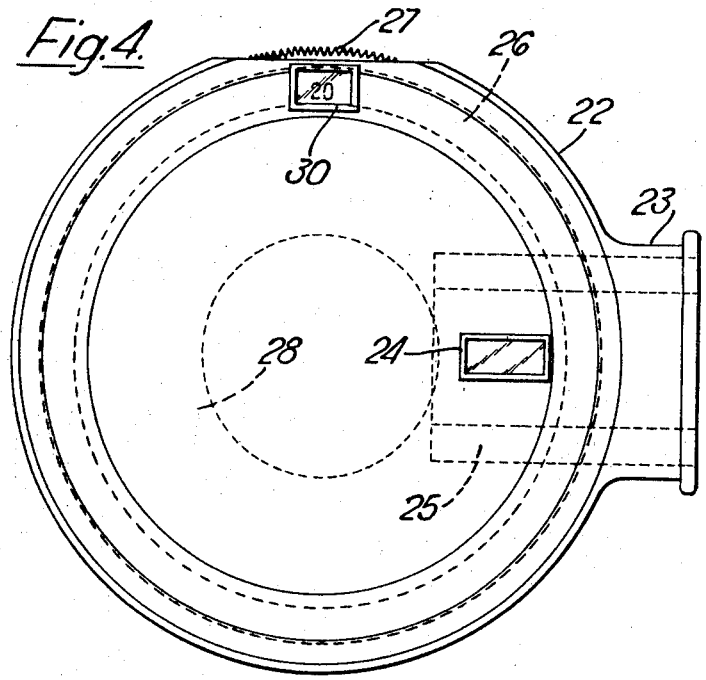
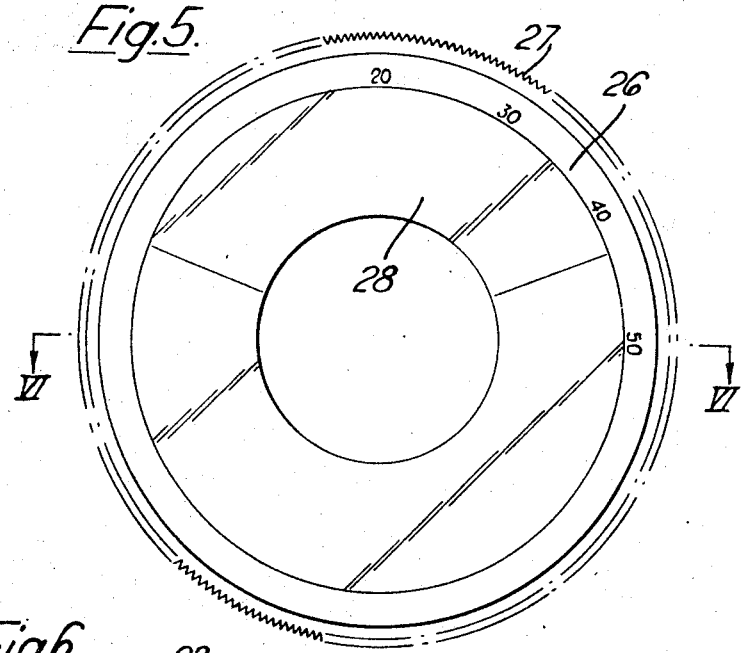
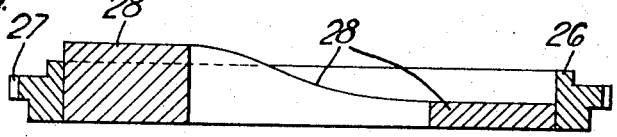

United States Patent Office 3,565,537
Patented Feb. 23, 1971

3,565,537
SPECIMEN HOLDER FOR EXAMPLE FOR TESTING THE COLOUR OF A LIQUID SUCH AS BLOOD
Jack Fielding, 17 Bracknell Gardens, Hampstead, London, NW. 3, England
Filed Oct. 30, 1968, Ser. No. 771,950
Int. Cl. G01n 1/10
U.S. Cl. 356—246                                              3 Claims

ABSTRACT OF THE DISCLOSURE

A specimen holder for use with an optical instrument. The holder includes a pair of sheets of translucent plastics material welded together in face-to-face relationship, a recess being formed in at least one of the plates to provide a thin, flat space of a closely defined constant thickness. Into this space may be drawn a liquid and the light absorbence or some other parameter may be measured. The holder is particularly suitable for use in determining the haemoglobin content of a specimen of blood.

---

The present invention relates to a specimen holder, and to an optical instrument with which it may be used. While the specimen holder of the invention may be used for other purposes, it is particularly useful for determining the colour of a liquid, e.g. in order to determine the haemoglobin content of blood. Various haemoglobinometers have been proposed which in themselves are expensive and require skill and time and chemical treatment of the blood specimen to carry out a test, to determine the haemoglobin content of a patient's blood. As a quick test, it has been proposed to place a drop of untreated blood on a piece of absorbent paper, such as filter paper, and to compare the colour of this paper with a colour chart. This method of testing is grossly inaccurate. Other methods of testing are extremely involved and time consuming.

It is an object of the present invention to overcome the above difficulties.

I now propose to provide a specimen holder for use with an optical measuring instrument, such holder comprising a pair of translucent plastics material plates, welded together in face-to-face relationship, at least one of the plates being formed with a recess, to provide a thin-flat space of a closely defined constant thickness, into which a liquid specimen may be drawn by capillary action.

The specimen holder, with the whole blood or other liquid therein, is arranged so that light from a common source passes through two adjacent light paths, one through the specimen holder, and the other through a separate filtering medium having a known light absorbence, and the intensity of light transmitted to the two light paths is made equal by visual matching or photo electric measurement.

The invention also provides a measuring instrument for use with a specimen holder according to the invention, such instrument comprising guide adapted to receive a holder, a light wedge of appropriate optical absorbence movable relative to said guide adjacent the location of said specimen holder, a light source positioned to pass light through said wedge and the recess of said specimen holder, and means for viewing the light passing through said wedge and said specimen holder.

By suitable calibration of the light wedge, the position of the wedge may give a reading of the light absorbed and thus the colour of the blood or other liquid in the specimen holder, when matching of the two light paths is achieved.

Conveniently, such light wedge is annular in form and is mounted on a toothed supporting wheel which can be rotated, e.g. by a gear-wheel engaging the teeth on the support wheel. A set of readings may be marked on the wheel and these may appear through a window in the casing of the instrument.

In order that the invention may more readily be understood, the following description is given, merely by way of example, reference being made to the accompanying drawings in which:

FIG. 4 is a top plan view of an instrument with which the holder of FIGS. 1, 2 and 3 may be used;

FIG. 5 is a plan view of the wedge carrier wheel of the instrument 4; and

FIG. 6 is a schematic side elevation of the wedge carrier wheel and wedge.

Figure 1:
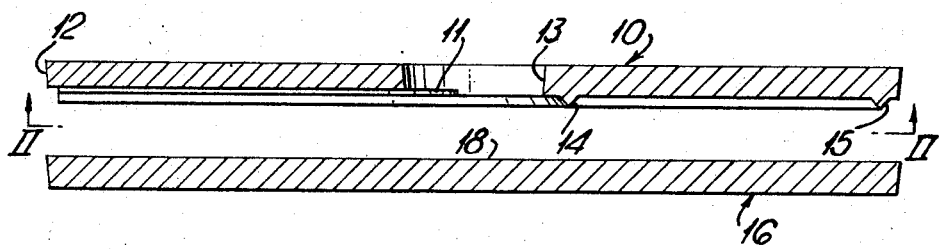
FIG. 1 is an exploded sectional view of one embodiment of specimen holder according to the invention, and taken on the line I—I in FIG. 3.
Figure 2:
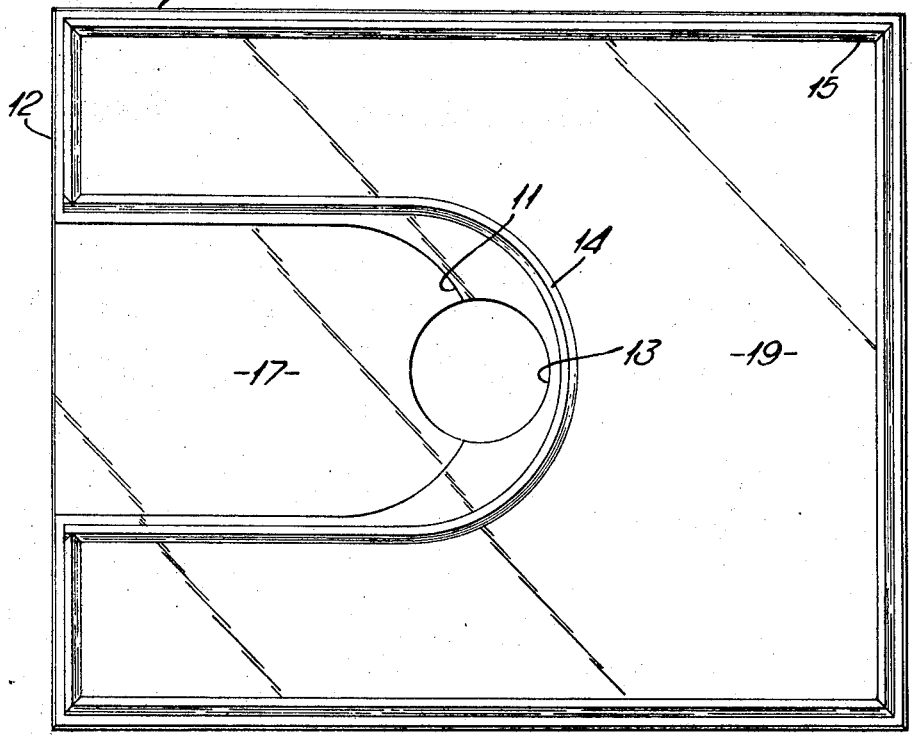
FIG. 2 is an underneath plan view of the upper plate of the holder of FIG. 1, as seen on the line II—II of FIG. 1.
Figure 3:
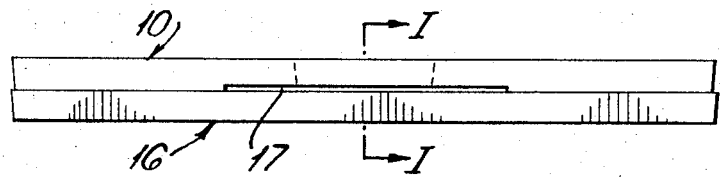
FIG. 3 is an end view of the holder shown in FIGS. 1 and 2.

Referring now to FIGS. 1, 2 and 3 of the drawings, the specimen holder illustrated therein comprises an upper plate 10, injection moulded in clear, transparent, crystal polystyrene, so as to have a recess 11 extending from one edge 12 to the centre of the plate 10. This recess is 0.1 millimetre in depth and is produced by optically polished flat and undistorted mating surfaces on the die.

A central aperture 13 extends through the plate 10 and intersects the recess 11. Surrounding the recess 11 is a first ridge, 14, the ridge 14 extending from near one edge 12 of the plate 10. Similarly, a second ridge 15 extends adjacent the periphery of the plate 10 and joins the ridge 14 close to the position where the latter meets the edge 12.

Positioned adjacent plate 10, a further plate 16 of identical overall dimensions the plate 16 being ultrasonically welded to the plate 10. During such ultrasonic welding the ridges 14 and 15 serve as energy directors for the ultrasonic waves.

By closely defining the limit to which the two plates 10 and 16 are cast or injection moulded, it is possible to produce a thin flat space 17 of closely defined constant thickness. It will be noted that each of the edges of the plates 10 and 16, and also the edge of the aperture 13 has a chamfer which is of the order of 5 degrees, this facilitating moulding and extraction of the moulded plates from the die.

If a spot of blood, or other liquid, is dropped into the aperture 13 it will fall on the upper surface 18 of the plate 16, and will immediately spread by capillary action throughout the space 17. Thus a film of blood or other liquid, of accurately defined thickness is produced in the specimen holder according to the invention.

Now if a light source is placed behind the specimen holder, with the blood or other liquid in it, the light emanating from the holder will be of a particular intensity. If blood is being tested, it is preferable to provide a filter which changes the colour of the light passing through the blood from red to green, since green is a more suitable colour for the purposes of comparison. It will be appreciated that the blood or other liquid may or may not be chemically treated in any way prior to testing, according to the parameter to be tested.

In a particularly convenient construction of instrument illustrated in FIGS. 4 to 6, the intensity can be determined by comparison, this being achieved by means of a light filtering wedge. In these figures of the drawings there is illustrated an instrument comprising a casing 22 of annular form and having a mounting extension 23 extending radially outwardly from one side. This extension 23 has a viewing aperture 24 on the upper surface thereof, and has extending therethrough a guide or support 25, into which the specimen holder illustrated in FIGS. 1 to 3 may be inserted. When the specimen holder is in position, the space 17 appears through the window, when a light source is shown from below through the instrument casing 22. When the holder slides into the guide 25, the end 12 is inserted first.

Within the casing 22, below the window 24, is a carrier wheel 26 having peripheral teeth 27 formed thereon. The wheel 26 may be rotated by a knob (not shown) having associated therewithin a pinion engaging the teeth 27, or by hand. Mounted on the wheel 26, is a wedge 28 (FIG. 6) which again is of a part annular form. This wedge is of suitable optical absorbence which again can be formed of a plastics material and can be securely positioned on the wheel 26 for rotation therewith. Marked on the wheel 26 are various indicia, which may appear through a window 30 in the casing 22. As illustrated in FIG. 4, the reading of 20 is shown appearing through this window 30. A filter is positioned below the viewing aperture 24, so as to convert the light emanating therefrom from red to green.

In use, the holder is introduced into the guide 25, and the green light emanating from the space 17, can be observed in the window 24 adjacent that passing through the wedge, and by suitable operation of the wedge carrying wheel 26, the wedge can be rotated until the intensity of both portions of the light emerging from the window 24 are identical. At this stage, the thickness of the wedge gives the measure of the haemoglobin content of the blood in the cell, and the instrument is suitably calibrated so that the number appearing through the window gives the actual concentration of haemoglobin in the blood.

While the instrument has been described as particularly suitable for testing haemoglobin content of the blood, it can equally well be utilised for comparing the colours of other liquids.

Instead of using an annular light wedge as discussed above, a simple straight or other shaped light wedge may be utilised.

Furthermore, by making suitable markings on the plates of the specimen holder, either during moulding or subsequently thereto, the plate can be used as a counting cell for use with a microscope, or scanning instrument.

The specimen holder of the present invention is of a very simple construction and is relatively cheap to manufacture, so that after use it can be thrown away. Thus an extremely accurate yet simple specimen holder is provided.

I claim:

1. A specimen holder for use with an optical measuring instrument, said holder comprising, in combination, a pair of translucent plastics material plates, welded together in face-to-face relationship, means defining a recess in at least one of said plates, effective to provide a thin, flat space of closely defined constant thickness, into which a liquid specimen may be drawn by capillary action, and an open aperture in one of said plates, said aperture passing through said plate and communicating with said recess.

2. A specimen holder as claimed in claim 1, wherein said recess extends to one edge of said plate.

3. A specimen holder as claimed in claim 2, wherein said aperture is formed in the same plate as said recess, so as to be at the far end of said recess from the point where said recess meets said one edge of said plate.

References Cited
UNITED STATES PATENTS

| | | | |
|---|---|---|---|
| 2,415,480 | 2/1947 | Gassert | 350—95XV |
| 3,031,924 | 5/1962 | Lamal | 350—95 |

RONALD L. WIBERT, Primary Examiner

O. B. CHEW II, Assistant Examiner

U.S. Cl. X.R.

350—95